Feb. 14, 1933.    A. STEINLE    1,897,282

TURRET ROTATABLY MOUNTED ON BOARD SHIP

Filed Sept. 8, 1932

Inventor:

Adolf Steinle

Patented Feb. 14, 1933

1,897,282

UNITED STATES PATENT OFFICE

ADOLF STEINLE, OF JENA, GERMANY, ASSIGNOR TO N. V. NEDERLANDSCHE INSTRU-
MENTEN COMPAGNIE "NEDINSCO", OF VENLO, NETHERLANDS

TURRET ROTATABLY MOUNTED ON BOARD SHIP

Application filed September 8, 1932, Serial No. 632,200, and in Germany August 10, 1931.

I have filed applications in Germany, August 10, 1931, and Italy, October 30, 1931.

The invention concerns a turret which is so mounted on board ship that it is rotatable about an axis perpendicular to the deck of the ship and which contains a sighting telescope for following aircraft, this sighting telescope being Cardanically mounted on deck and influenced by a stabilizing device in such a manner that one axis of rotation of the sighting line is permanently vertical.

According to the invention, the telescope may be given the smallest possible loop-hole in the turret by so coupling it to this turret that a rotation of its sighting line about the said permanently vertical axis imparts to the turret a rotation through an equal angle about the turret axis perpendicular to the ship's deck.

If an observation instrument, for instance a rangefinder, is disposed in the turret in such a manner that at least part of this instrument is mounted to the turret for rotation about an axis perpendicularly crossing that of the turret, so that, contrary to the said sighting telescope, it is not in connexion with a stabilizing means, the bigger rotations of the turret about its axis perpendicular to the ship's deck, which so far have been required in connexion with observation instruments of this kind when the ship was labouring and an aircraft in proximity to the zenith had to be viewed, may be dispensed with. In the present case the rotation of the turret caused by the said coupling is sufficient when the observation instrument, or part of it, is rotatable relatively to the turret also about an axis which is parallel to the plane described by the sighting line of the observation instrument when the movable parts of the device are rotated about the first said axis and which is perpendicular to the sighting line of the observation instrument.

Figure 1:
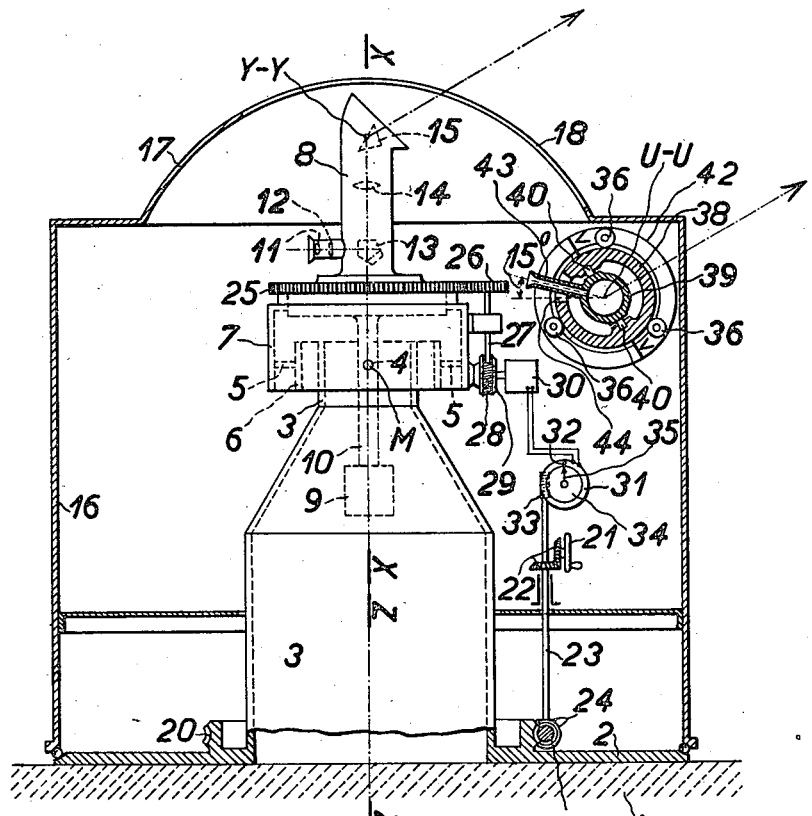
Figure 2:
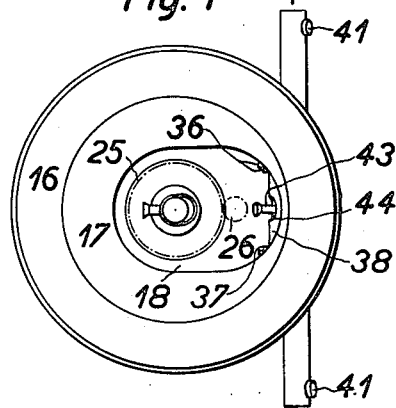

The accompanying drawing illustrates a constructional example of a turret according to the invention. Figure 1 represents the turret in elevation, in a section through its longitudinal axis. Figure 2 is a top view of the turret on a reduced scale.

On the ship's body 1, a plate 2 is assumed to be so fixed that its lower surface is horizontal when the ship is in smooth water. The central part of the plate 2 takes the form of a housing 3 on which an annular body 7 is Cardanically mounted by means of pins 4 and 5 and a ring 6. In this annular body, a sighting telescope 8 is so mounted for rotation about an axis X—X that this axis contains the Cardan centre of the annular body 7. A weight 9 which is fixed to a rod 10 connected to the telescope 8 and imparts a pendulum effect to the telescope 8, and consequently also to the annular body 7, makes the axis X—X remain vertical regardless of the ship's labouring. The telescope 8 has the following optical members: an ocular 11, a sighting mark 12, a pentagonal roof prism 13, an objective 14, and, in front of this objective, a prism 15. The optical axis of the objective 14, which is at the same time the longitudinal axis of the telescope, coincides with the axis of rotation X—X. For the purpose of following targets under different altitudinal angles, the prism 15 is rotatable about an axis Y—Y lying in its reflecting surface and perpendicularly intersecting the axis X—X. As mentioned above, the entire telescope is rotatable also about the axis X—X (in the azimuth), as a consequence of which this telescope may follow a target regardless of what position this target assumes in the space.

A turret 16, whose cupola 17 is provided with a loophole 18, is so mounted on the plate 2 that it rotates about an axis Z—Z which is perpendicular to the lower surface of this plate and contains the Cardan centre M. When, as is assumed in the drawing, the ship is in smooth water, the axis of rotation X—X of the telescope 8 and the axis of rotation Z—Z of the turret 16 coincide. To enable the turret 16 being rotated relatively to the plate 2, this turret has a worm 19 meshing with a worm-wheel rim 20 of the plate 2. When the worm 19 is actuated by means of a hand wheel 21, a pair of bevel wheels 22, a shaft 23, and a pair of bevel wheels 24, it rolls on the worm-wheel rim 20 and, consequently, rotates the turret 16.

To ensure that the turret is rotated about its axis of rotation Z—Z through an angle equal to that through which the telescope 8 is rotated about its axis of rotation X—X, the following arrangement is made. The telescope 8 is provided with a toothed-wheel rim 25 engaging in a pinion 26 mounted on the annular body 7. On a shaft 27 fast with the pinion 26 is fixed a worm 28 which engages in a worm wheel 29 mounted on the annular body 7. The worm wheel 29 actuates a transmitter 30 which is so connected to a receiver 31 that to an index 32 connected to this receiver is imparted a rotation corresponding to that of the telescope 8 about its axis X—X. A worm 33 fast with the shaft 23 rotates a worm wheel 34 which has an index 35. The indices 32 and 35 represent a following mechanism. When rotating the telescope 8 about its axis of rotation X—X, and when so rotating the turret 16 by means of the handwheel 21 about its axis of rotation Z—Z that the two indices 32 and 35 remain in coincidence, the rotations of the turret 16 and the telescope 8 about their axes of rotation Z—Z and X—X, respectively, are equal as required.

By means of two groups of rollers each of which comprises three rollers 36 and 37, respectively, a sleeve 38 is mounted in the turret 16 for rotation about an axis U—U which perpendicularly crosses the axis of rotation Z—Z of the turret 16. In the sleeve 38 a rangefinder 39 is disposed in such a manner that, by means of two pins 40, it may be rotated in this sleeve 38 about an axis V—V perpendicularly intersecting the axis U—U. The sighting apertures 41 of the range-finder 39 are outside the turret 16. In this turret are provided two lateral holes 42 (of which only one is visible in the drawing). These holes 42 must have dimensions permitting to rotate the rangefinder 39 about the axis V—V so as to counteract the labouring of the ship. The ocular 43 of the rangefinder 39 extends through a bore 44 in the sleeve 38. This bore 44 must be wide enough to permit the rangefinder 39 to rotate about the axis V—V.

When following an aircraft, the observer at the ocular 11 of the telescope 8 is to rotate the whole telescope about the axis X—X and the prism 15 about the axis Y—Y so as to maintain the coincidence of target and sighting mark 12. By turning the handwheel 21, another attendant is to keep the indices 32 and 35 in coincidence, and by rotating the rangefinder 39 about its two axes U—U and V—V, the observer has to maintain this rangefinder directed upon the target. The only purpose of the rotation about the axis V—V is to compensate the labouring of the ship. If the water were permanently smooth, this rotation could be dispensed with. Owing to the rotations of the turret 16 and the rangefinder 39 about the axes of rotation Z—Z and U—U, respectively, the azimuthal rotation of the rangefinder would be sufficient for following the target.

I claim:

1. A turret, means for so mounting this turret on the deck of a ship that it is rotatable about an axis perpendicular to the deck, a sighting telescope adapted to follow aircraft and Cardanically disposed on the deck inside the turret, the telescope having means for rotating its sighting line about an axis, a stabilizing device connected to the telescope and adapted to maintain this axis vertical, and means coupling the telescope and the turret and effecting that rotating the sighting line of the telescope about the said vertical axis entails an equal rotation of the turret about its axis of rotation relatively to the deck.

2. In a turret according to claim 1, an observation instrument mounted at the turret for rotation about an axis perpendicularly crossing the axis of rotation of the turret, this instrument being rotatable relatively to the turret also about an axis which is parallel to the plane described by the sighting line of the instrument when this instrument is rotated about the first said axis and which is perpendicular to the sighting line of the instrument.

ADOLF STEINLE.